US006795057B2

(12) United States Patent
Gordon

(10) Patent No.: US 6,795,057 B2
(45) Date of Patent: Sep. 21, 2004

(54) FACILE ERGONOMIC COMPUTER POINTING DEVICE

(75) Inventor: Gary B. Gordon, Saratoga, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 161 days.

(21) Appl. No.: 10/085,653

(22) Filed: Feb. 28, 2002

(65) Prior Publication Data

US 2003/0160765 A1 Aug. 28, 2003

(51) Int. Cl.7 .................................................. G09G 5/08
(52) U.S. Cl. ....................................... 345/163; 345/158
(58) Field of Search ................................ 345/156, 157, 345/158, 159, 160, 161, 163, 164, 165, 166

(56) References Cited

U.S. PATENT DOCUMENTS

| | | | | |
|---|---|---|---|---|
| 4,780,707 A | * | 10/1988 | Selker | 345/163 |
| 4,922,236 A | | 5/1990 | Heady | |
| 6,043,807 A | | 3/2000 | Carroll | |
| 6,151,015 A | | 11/2000 | Badyal et al. | |
| 6,377,245 B1 | * | 4/2002 | Park | 345/163 |
| 2003/0006965 A1 | * | 1/2003 | Bohn | |
| 2003/0058219 A1 | * | 3/2003 | Shaw | |

OTHER PUBLICATIONS

Hewlett–Packard Installation and Setup Guide for Omnibook—1993.

* cited by examiner

*Primary Examiner*—Vijay Shankar
(74) *Attorney, Agent, or Firm*—Judy Liao Shie

(57) ABSTRACT

An ergonomic mouse has an upright freestanding body that is designed to be gripped by a user's fingers in a writing position and manipulated like a writing implement. The mouse has a body shaped like a pen. The pen is coupled to a weighted base so the mouse remains freestanding and does not need to be picked up before each use. The mouse has a primary switch that is activated by the weight of the user's hand bearing down upon the pen. A secondary switch is located on the pen. Alternatively, the ergonomic mouse has a small body that can be gripped in the fingers much like a pen. The small-bodied mouse has switches on its base surface that are activated by the weight of the user's hand bearing down upon the mouse body.

16 Claims, 4 Drawing Sheets

FACILE ERGONOMIC COMPUTER POINTING DEVICE

FIELD OF THE INVENTION

The invention is directed towards the field of electronic circuitry, and more specifically, towards ergonomic input devices such as a computer mouse.

BACKGROUND OF THE INVENTION

Repetitive Strain Injuries (RSI) are a modern-day hazard in the computer-using workforce, and are a leading cause of occupational injuries in the United States today. Computer mouse usage is blamed for many of these injuries. A mouse is typically used as an input device that controls the movement of a cursor or other display element on a display screen. The conventional and most commonly used mouse resembles a bar of soap in shape and size. This "soap bar" mouse is designed such that a user's palm and fingers rest on the mouse body when moving the mouse or activating its buttons. Unfortunately, this design requires the user's fingers to be splayed out over the mouse body and buttons, instead of being slightly curled in as is natural when the hand is relaxed. Furthermore, the hand is completely pronated (rotated so that the palm faces down, parallel to the desk top) while working the mouse. This unnatural position strains the tendons in the hand, and can be harmful especially when maintained for an extended period of time. A more natural and ergonomic position for the hand is one where the palm and wrist are 45° to 90° less twisted. Finally, the primary switch on a conventional mouse is designed to be activated by a tap of the forefinger. However, this requires the forefinger to be flexed repeatedly while the hand is pronated. This motion can strain the finger tendons.

Many computer pointing devices have ergonomic features that strive to minimize user discomfort. For instance, a joystick mouse is gripped like a vertical bicycle handle, which keeps the palm perpendicular to the desktop and the fingers curled in. However, it is difficult to control a joystick with the high degree of accuracy required by many Computer-Aided Design (CAD) tools, since a joystick is manipulated with hand and arm muscles that are better suited to gross motor movement than to fine motions.

A tablet and stylus combination, such as the ones made by Wacom Technology Co., offers the user more control, precision, and accuracy. The stylus is held like a pen, and the dexterous finger muscles have great control over the stylus. Additionally, the hand remains in a natural and relaxed position. Unfortunately, the stylus must be used with a special surface such as the tablet—it will not work when used on a desktop. Also, the primary switch mechanism usually involves tapping the stylus against the surface of the tablet—again, this will not work on an ordinary desktop. Furthermore, the pen must be picked up each time it is to be used, which is a repetitive inconvenience.

Finally, in U.S. Pat. No. 6,151,015 to Badyal et al (assigned to Agilent Technologies) a pen-like computer pointing device is disclosed that uses an optical sensor to scan a work surface. Although the pointing device is an ergonomic, working solution, it must be picked up with each use. Furthermore, the pointing device is sensitive to the angle at which it is held, since the optical sensor contained within requires the pointing device to be held at a certain angle. If the pointing device is tilted beyond the narrow range of the optical sensor, the pointing device stops functioning. Also, the optical sensor within the pointing device must be oriented in the same direction during use, requiring the user to rotate the pointing device to the correct orientation before each use. Finally, the primary switch mechanism employed by the pointing device is a button on the body of the device, which still requires a tap of the forefinger and can strain the finger tendons if used repetitively.

Consequently, there remains a need for an ergonomic computer pointing device that does not need to be picked up before each use, has accurate positioning capability and an improved switch mechanism, while allowing a user's hand to remain in a natural, relaxed position.

SUMMARY OF THE INVENTION

The general idea for the present invention was partially derived by observing the writing process. Writers use an inherently ergonomic hand position, hereinafter referred to as the writing position: the fingers remain curled, not splayed out; the hand is angled between 45 degrees and 90 degrees to the work surface, never completely pronated. Additionally, the number of RSI cases associated with writing is relatively low, compared to the number of computer-related RSI cases. Therefore, it is logical and reasonable for an ergonomic mouse to recreate the hand positions and motions used in writing.

In accordance with an illustrated preferred embodiment of the present invention, an ergonomic mouse-pen is designed to be held in the writing position and manipulated like a writing implement. The mouse-pen is in communication with a computer or other instrument having a display screen. The mouse-pen has an elongated, cylindrical rod that is grasped in the fingers like a pen, enabling fine motor control for accuracy in placement of the mouse. The cylindrical rod is flexibly coupled to a weighted base so the mouse-pen remains upright and freestanding and does not need to be picked up before each use. The cylindrical rod can be shaped to have facets along its body for the user's fingers to rest upon. This helps the user to automatically and effortlessly make any slight orientation corrections each time the user grasps the mouse-pen.

A relative motion sensor is installed in the base of the mouse-pen. The relative motion sensor senses movement of the mouse-pen and translates the movement into corresponding movement of a pointer, cursor, displayed element, or other object on the display screen. The relative motion sensor can be an optical sensor, although a mechanical ball bearing mechanism (such as the kind used in conventional mice) may be used if the ball bearing mechanism is small enough. If the relative motion sensor used is an optical sensor, the base keeps the optical sensor at a constant angle to the work surface and prevents undesirable tilting.

A primary switch is located at the juncture between the body and the base. The primary switch is activated by a downward motion on the body, as if the user were pressing a ball-point pen harder into a sheet paper. The entire weight of the hand is used in bearing down to actuate the primary switch, avoiding the painful motion of flexing just the forefinger alone. One or more optional secondary switches can be located in the body of the mouse-pen. The switches are typically activated to make a selection of an object or group of objects on the display screen, or to bring up a new menu.

In an alternate embodiment of the present invention, an ergonomic mini-mouse has a small body designed to be gripped between the thumb and the first two or three fingers of the hand. This allows the hand and fingers to remain in the natural and relaxed writing position. The small size of the mini-mouse serves primarily to facilitate dexterous use and control by the fingers, the same way one uses a pencil. Since deft finger muscles control the mini-mouse, it is possible to position the mini-mouse very accurately. Furthermore, the small size of the mini-mouse is well suited to the limited amount of space associated with laptop computers.

The mini-mouse is also inherently freestanding by design—there is no need to pick up the mini-mouse before each use. Switches are installed on the bottom of the mini-mouse, to be activated by a downward press against the work surface. For example, bearing down on the mini-mouse body towards the left actuates a left-sided switch; bearing down to the right actuates a right-sided switch. The entire weight of the hand is used to bear down on the mini-mouse to actuate these switches.

Further features and advantages of the present invention, as well as the structure and operation of preferred embodiments of the present invention, are described in detail below with reference to the accompanying exemplary drawings. In the drawings, like reference numbers indicate identical or functionally similar elements.

DETAILED DESCRIPTION

Figure 1A:
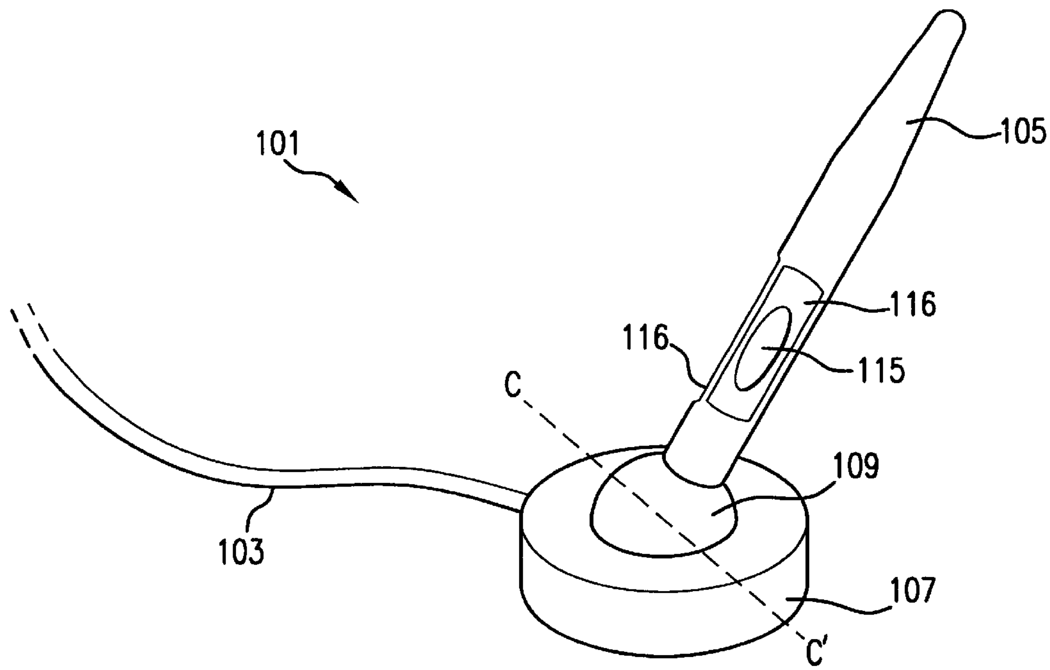
FIG. 1A shows a perspective view of a preferred embodiment of an ergonomic mouse-pen constructed in accordance with the present invention.

FIG. 1A shows a perspective view of a preferred embodiment of an ergonomic mouse-pen 101, constructed in accordance with the present invention. Although not explicitly depicted in the figure, mouse-pen 101 is resting on a work surface, such as a desktop. The mouse-pen 101 controls the movement of a pointer, cursor, displayed element, or other object on the display screen of a computer or other instrument. As the mouse-pen 101 traverses the work surface, the movement of the mouse-pen 101 on the work surface corresponds with the movement of an object on the display screen. The mouse-pen 101 is shown in FIG. 1A to be attached to the computer by a cord 103, but the mouse-pen 101 can also communicate with the computer via a wireless link. In a wireless mouse, the pen body of the mouse-pen 101 makes a particularly good location for an internal antenna.

The mouse-pen 101 has a cylindrical rod 105 connected to a base 107 by a flexible coupling 109. The flexible coupling 109 can be a bendable piece of plastic or elastomer that returns to a set shape. The cylindrical rod 105 has sufficient length to be gripped by the fingers in the writing position, in the same manner as any writing implement. For illustrative purposes only, an exemplary size for the cylindrical rod 105 is fifteen centimeters in length. The flexible coupling 109 is flexible enough to allow the angle between the cylindrical rod 105 and the work surface to change as the user manipulates the mouse-pen 101. At the same time, the flexible coupling 109 remains rigid enough to maintain the cylindrical rod 105 at a convenient angle when the mouse-pen 101 is not in use. This convenient angle can be between 40° and 90° to the work surface, and is preferably between 50° and 80°. In a preferred embodiment, the angle is set at 60° to the work surface, the angle at which many people feel comfortable holding a pen. The angle can conceivably be less than 40°, which still allows the mouse-pen 101 to be picked up more easily than if it were lying flat on the work surface. The user can then adjust the cylindrical rod 105 to a more comfortable angle as desired. Alternatively, the cylindrical rod 105 can be attached to the base 107 with a rigid material that maintains a fixed angle between the cylindrical rod 105 and the work surface. This is a less desirable embodiment since the mouse-pen 101 becomes more difficult to manipulate.

Figure 1B:
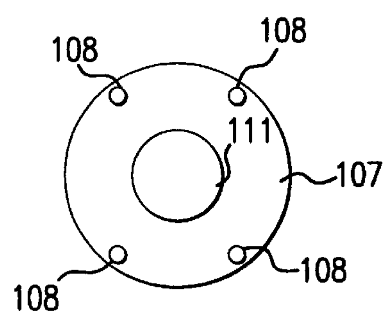
FIG. 1B shows a bottom view of the base of the ergonomic mouse-pen of FIG. 1A.

FIG. 1B shows a bottom view of the base 107 of the mouse-pen 101. The base 107 has low friction glide pads 108 on its bottom surface that make sliding across the work surface easier. Low friction glide pads 108 are optional and can be left off of the base 107. The base 107 is sufficiently weighted to keep the mouse-pen 101 upright when not in use. The base 107 is preferably small, less than 4 centimeters in width, so that it does not interfere with the finger grip on the cylindrical rod 105. For illustrative purposes only, an exemplary size for the base 107 is three centimeters in diameter. Although the base 107 as drawn in FIG. 1B is round, the base 107 is not limited to round shapes. The cylindrical rod 105 is shown attached to the center of the base 107, but the cylindrical rod 105 can be attached to other locations on the base 107 as well. For example, the base 107 may be positioned forward of the cylindrical rod 105, which offers two advantages. By being forward, the base 107 will not interfere with the fingers. Additionally, the center of gravity of the base 107 will offset the rearward center of gravity of the cylindrical rod 105, thus making the mouse-pen 101 more stable and less likely to tilt over when not being held.

Aperture 111 represents the general location of a relative motion sensor installed in the base 107. The relative motion sensor can be an optical sensor, although a mechanical ball bearing mechanism (such as the kind as used in conventional mice) may be used if the ball bearing mechanism is small enough to fit into the base 107.

Figure 1C:
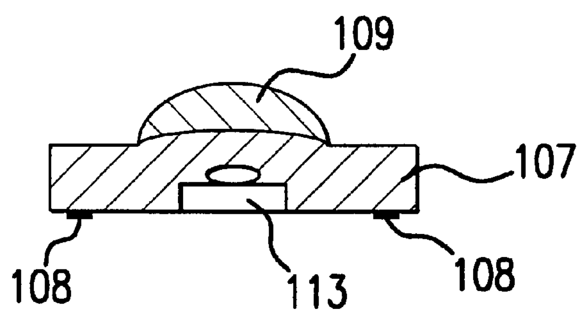
FIG. 1C shows a cross-sectional diagrammatic view of the ergonomic mouse-pen, taken along the line C–C' in FIG. 1A, showing the location of a primary switch. For ease of illustration, the pen body is not shown, and the primary switch is not shown in cross-sectional view.

FIG. 1C shows a cross-sectional diagrammatic view of the mouse-pen 101, taken along the line C–C' in FIG. 1A. A primary switch 113 is located within the base 107 and flexible coupling 109. The base 107 and flexible coupling 109 are shown as two disparate parts, but may be one integrated piece. For ease of illustration, the cylindrical rod 105 is not shown, and the primary switch 113 is not shown in cross-sectional view. The primary switch 113 can be an axial pressure switch. The primary switch 113 is activated by a downward motion of the cylindrical rod 105 (not shown), as if the user were pressing a ballpoint pen harder into a sheet of paper. The entire weight of the hand bears down upon the cylindrical rod 105 to activate the primary switch 113. This motion occurs without appreciable movement, and is an improvement over previous mechanisms requiring single finger taps that can strain the finger tendons.

Returning now to FIG. 1A, at least one optional secondary switch 115 can be located in the cylindrical rod 105 of the mouse-pen 101. The secondary switch 115 shown in FIG. 1A is positioned for activation by the thumb, but the secondary switch 115 can be located elsewhere along the cylindrical rod 105 so as to be more conveniently activated by a user's first, second, or third finger. The secondary switch 115 can also be a scroll wheel button. The cylindrical rod 105 can optionally have flat facets 116 to make finger placement easier, and to facilitate alignment and orientation of the mouse-pen 101.

The mouse-pen 101 is designed to be held and moved like a writing implement. There are two primary motion mechanisms used when manipulating the mouse-pen 101: a gross motion and a fine motion. The gross motion is used when relatively large distances are to be traveled by the pointer on the corresponding display screen. The user grasps the mouse-pen 101 in the fingers, and then slides the hypothenar (the fleshy region of the palm under the little finger) along the work surface, exerting primarily just the arm muscles. Writers make similar gross motions when they reorient the hand between one word and the next, or between the end of one line and the beginning of the next.

The fine motion is used when smaller distances need to be covered on the corresponding display screen, or when more precision and accuracy is desired from the mouse-pen 101. First, the hypothenar is anchored in place to stabilize the hand. Then, using the dexterous finger muscles, the user can control the tip of the mouse-pen 101 with great accuracy to pinpoint a desired location on the corresponding display screen. The corresponding writing analogy is the motion of forming and connecting the letters within a word.

Figure 2A:
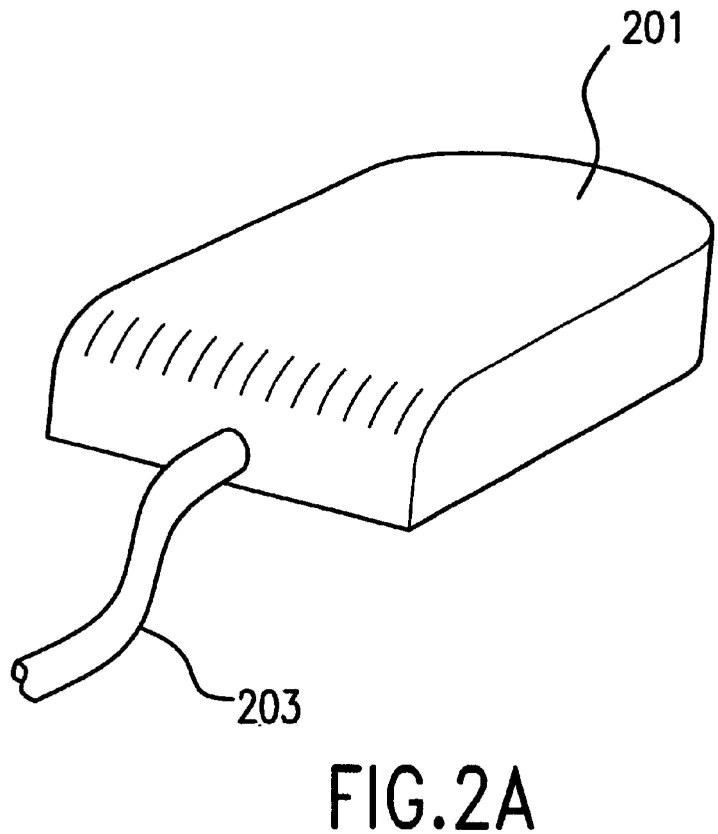
FIG. 2A shows a perspective view of a preferred embodiment of an ergonomic mini-mouse, constructed in accordance with the present invention.

FIG. 2A shows a perspective view of a preferred embodiment of an ergonomic mini-mouse 201, constructed in accordance with the present invention. Although not explicitly depicted in the figure, mini-mouse 201 is resting on a work surface, such as a desktop. The mini-mouse 201 controls the movement of a pointer, cursor, displayed element, or other object on the display screen of a computer or other instrument. As the mini-mouse 201 traverses a work surface, the movement of the mini-mouse 201 on the work surface corresponds with the movement of an object on the display screen. The mini-mouse 201 as shown in FIG. 2A is attached to the computer by a cord 203, but the mini-mouse 201 can also communicate with the computer via a wireless link. The mini-mouse 201 is inherently upright and freestanding by design there is no need to pick up the mini-mouse 201 before each use.

Figure 2B:
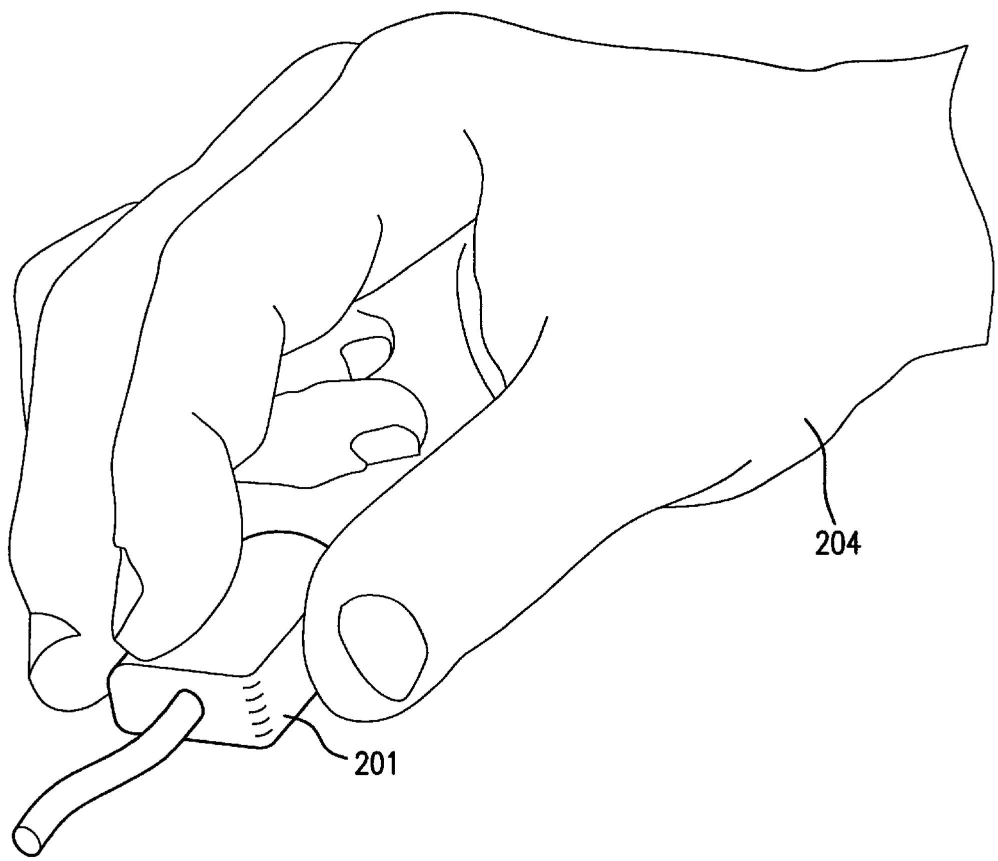
FIG. 2B is a sketch of how a user should grasp the ergonomic mini-mouse of FIG. 1A.

FIG. 2B is a sketch of how a user's hand 204 should grasp the mini-mouse 201. The mini-mouse 201 is very small, typically less than one cubic inch in volume. The small size of the mini-mouse 201 allows it to be gripped between just the thumb and the first two or three fingers of the hand. The hand and fingers remain in the natural and relaxed writing position, and move the mini-mouse 201 like a writing implement. The width of the mini-mouse 201 is preferably less than four centimeters, to avoid spreading the thumb and fingers unduly. For illustrative purposes only, an exemplary width for the mini-mouse 201 is approximately 2.5 centimeters. Like the mouse-pen 101, the mini-mouse 201 is manipulated using the two primary motion mechanisms described above. Gross motions are made by sliding the hypothenar across the work surface. Fine motions are made by first anchoring the hypothenar, and then using the fine motor control of the fingers to pinpoint the placement of the mini-mouse 201.

Figure 2D:
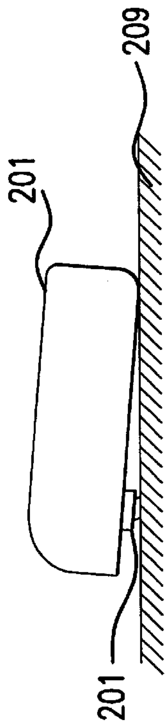
FIG. 2D shows a side view of the ergonomic mini-mouse.
Figure 2E:
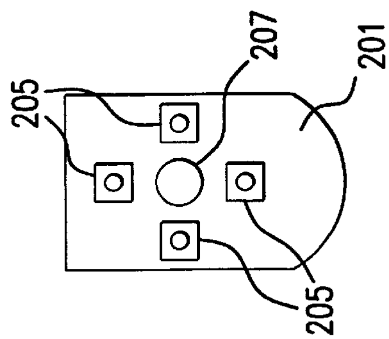
FIG. 2E shows a bottom view of an alternate embodiment of the ergonomic mini-mouse.
Figure 2C:
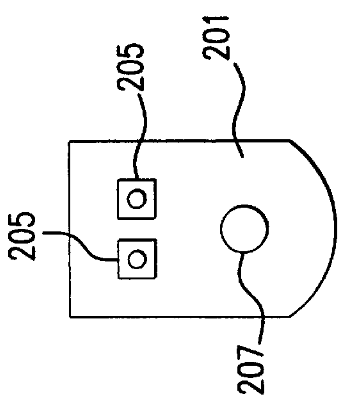
FIG. 2C shows a bottom view of the ergonomic mini-mouse.

FIG. 2C shows a bottom view of the mini-mouse 201. Switches 205 are located on the bottom of the mini-mouse 201. An aperture 207 represents the general location of a relative motion sensor in the bottom of the mini-mouse 201. The relative motion sensor can be an optical sensor, although a mechanical ball bearing mechanism may be used if the ball bearing mechanism is small enough to fit into the mini-mouse 201.

FIG. 2D shows a side view of the mini-mouse 201, resting on a work surface 209. Only a single switch 205 can be seen in the side view, but both switches 205 are in contact with the work surface 209. To work a switch, the user simply bears down on the mini-mouse 201 towards the switch that is to be activated. For instance, to actuate a switch on the left side of the mini-mouse 201, the user should bear down to the left; to actuate a right-sided switch, the user should bear down to the right. The switches 205 should be stiff enough to prevent inadvertent activation when the user is only moving the mini-mouse 201.

FIG. 2E shows a bottom view of an alternative embodiment of the mini-mouse 201. The aperture 207 still represents the general location of a relative motion sensor. Although more switches 205 are included in this embodiment than in the previous embodiment of FIG. 2D, the activation mechanism for the switches 205 remains the same. To actuate a switch on the left side of the mini-mouse 201, the user should bear down to the left; to actuate a right-sided switch, the user should bear down to the right. To actuate a switch at the front of the mini-mouse 201, the user should bear down to the front; to actuate a switch at the rear, the user should bear down to the rear.

Although the present invention has been described in detail with reference to particular preferred embodiments, persons possessing ordinary skill in the art to which this invention pertains will appreciate that various modifications and enhancements may be made without departing from the spirit and scope of the claims that follow.

I claim:

1. An ergonomic miniature mouse, the mouse in communication with a computer or instrument having a display screen, comprising:

an upright freestanding body, having a base surface for resting and sliding upon a work surface, the freestanding body adapted for gripping by a user's fingers in a writing position while the user's hand is in contact with the work surface;

a relative motion sensor at the base surface of the freestanding body, for translating movement of the mouse into corresponding movement of an object on the display screen; and at least one primary switch connected to the freestanding body, adapted for activation by the weight of the user's hand bearing down onto the freestanding body such that activation of the primary switch corresponds to a selection on the display screen.

2. An ergonomic mouse as in claim 1, wherein the freestanding body is less than 1 cube inch in volume.

3. An ergonomic mouse as in claim 2, wherein the freestanding body is less than four centimeters wide.

4. An ergonomic mouse as in claim 3, wherein the freestanding body is approximately 2.5 centimeters wide.

5. An ergonomic mouse as in claim 3, wherein the relative motion sensor is an optical sensor.

6. An ergonomic mouse as in claim 5, wherein the primary switch is in contact with the work surface.

7. An ergonomic mouse as in claim 6, wherein the ergonomic mouse communicates with the computer via a wireless link.

8. An ergonomic mouse, the mouse in communication with a computer or instrument having a display screen, comprising:

a weighted base, having a base surface for resting and sliding upon a work surface;

an optical sensor at the base surface of the weighted base;

a cylindrical rod flexibly coupled to the weighted base, such that the cylindrical rod is elevated at an angle to the work surface, the cylindrical rod having sufficient length to be held in a user's fingers like a writing implement while the user's hand is in contact with the work surface; and at least one switch in the weighted base, actuated by the weight of the user's hand bearing down onto the cylindrical rod.

9. An ergonomic mouse, the mouse in communication with a computer or instrument having a display screen, comprising:

a weighted base having a base surface for resting and sliding upon a work surface;

a cylindrical rod having sufficient length to be held in the user's fingers like a writing implement while the user's hand is in contact with the work surface, the cylindrical rod being coupled to the weighted base such that the cylindrical rod is elevated at an angle between 40° and 90° to the work surface;

relative motion sensor at the base surface of the weighted base, far translating movement of the mouse into corresponding movement of an object on the display screen; and at least one primary switch in the weighted base, adapted for activation by the weight of the user's hand bearing down onto the cylindrical rod such that the activation of the primary switch corresponds to a selection on the display screen.

10. An ergonomic mouse as in claim 9, wherein the coupling between the cylindrical rod and the weighted base is flexible.

wherein the freestanding body further comprises:

a weighted base; and a cylindrical rod having sufficient length to be held in the user's fingers like a writing implement, the cylindrical rod being coupled to the weighted base such that the cylindrical rod is elevated at an angle between 40° and 90° to the work surface.

11. An ergonomic mouse as in claim 10, wherein the relative motion sensor is an optical sensor.

12. An ergonomic mouse as in claim 11, wherein the weighted base is no wider than four centimeters.

13. An ergonomic mouse as in claim 12, wherein the cylindrical rod has facets to facilitate placement of the user's fingers and orientation of the mouse.

14. An ergonomic mouse as in claim 13, further comprising a secondary switch in the cylindrical rod.

15. An ergonomic mouse as in claim 14, wherein the secondary switch is also a scrolling wheel.

16. An ergonomic mouse as in claim 15, wherein the ergonomic mouse communicates with the computer via a wireless link.

* * * * *